L. K. STAFFORD.
JOURNAL BOX.
APPLICATION FILED APR. 27, 1920.
1,370,377.
Patented Mar. 1, 1921.
2 SHEETS—SHEET 2.
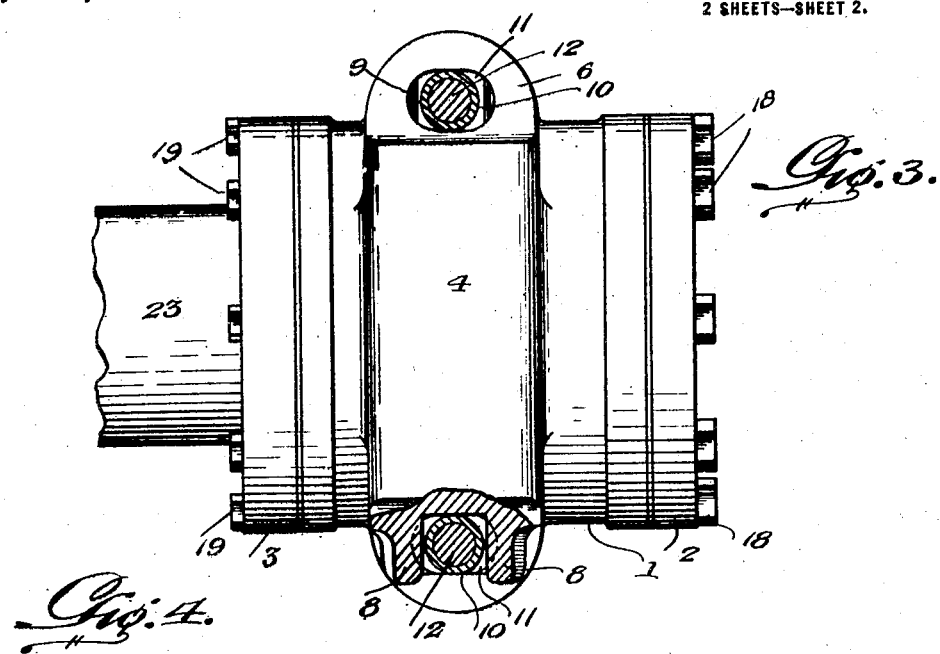
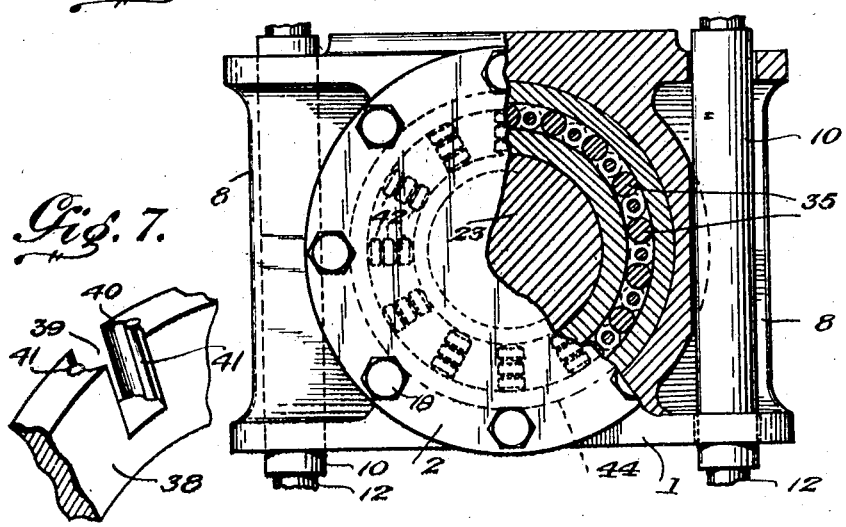
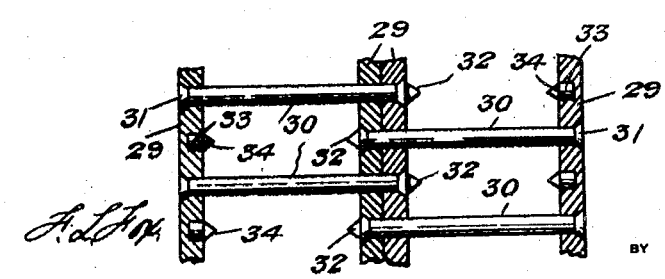
L. K. Stafford.
INVENTOR
BY Victor J. Evans.
ATTORNEY
WITNESSES:

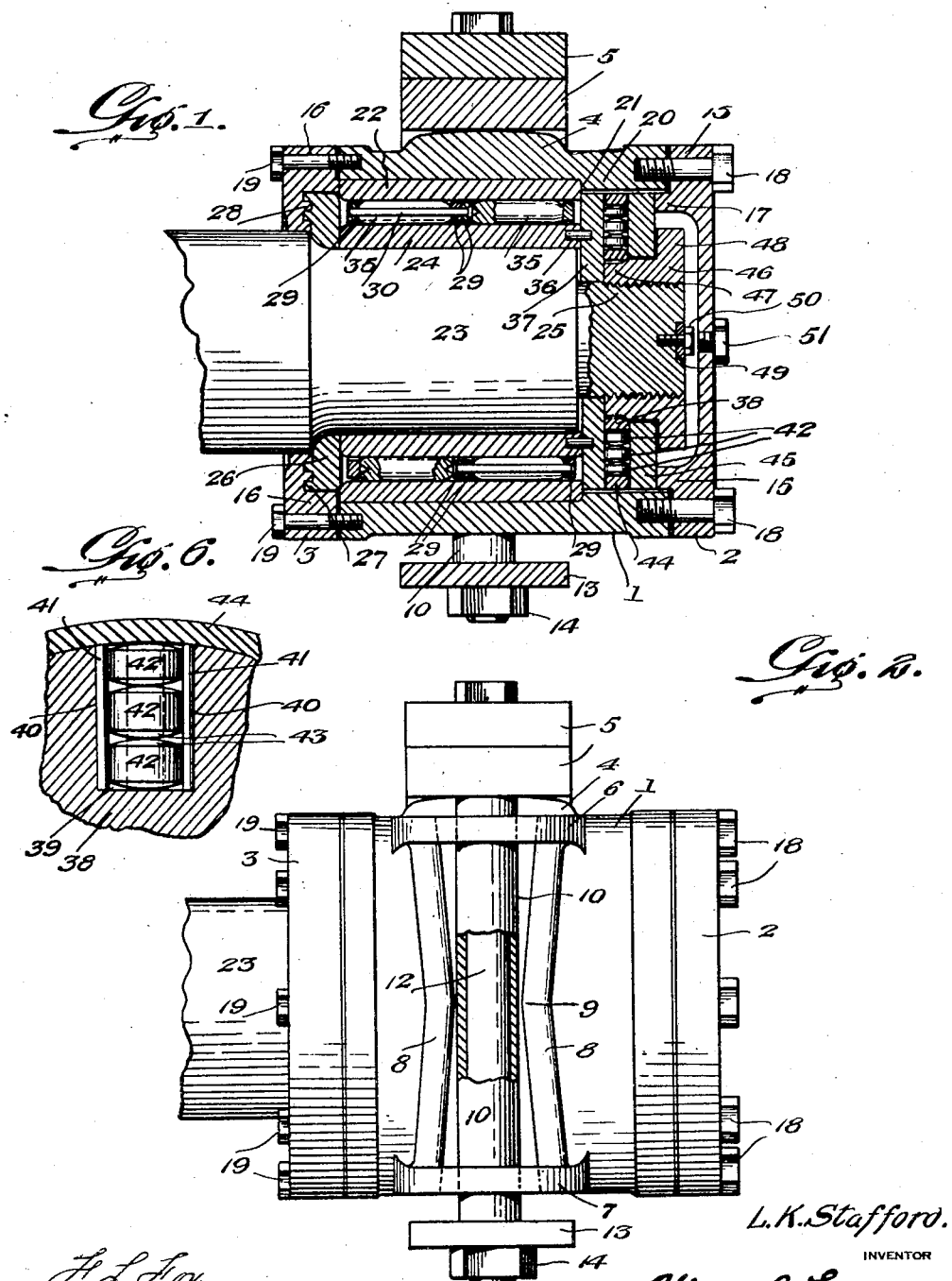

UNITED STATES PATENT OFFICE.

LEO K. STAFFORD, OF DETROIT, MICHIGAN.

JOURNAL-BOX.

1,370,377. Specification of Letters Patent. Patented Mar. 1, 1921.

Application filed April 27, 1920. Serial No. 376,971.

*To all whom it may concern:*

Be it known that I, LEO K. STAFFORD, a citizen of the United States, residing at Detroit, in the county of Wayne and State of Michigan, have invented new and useful Improvements in Journal-Boxes, of which the following is a specification.

My present invention has reference to roller bearings for railway trucks, and may be considered in the nature of an improvement over my applications filed by me on Sept. 6, 1919 and on January 27, 1920, and bearing respectively the Serial Numbers 322,027 and 354,425.

My referred to applications are primarily devised for use on light weight rolling stock, while my present application is especially adaptable for heavy rolling stock, and has for its primary object to produce a bearing box for a railway truck, of a novel construction, of great strength and durability, and wherein friction between the stationary and movable parts is reduced to a minimum if not entirely overcome.

In carrying out my present invention it is my purpose to produce a journal box for railway trucks in which the axle spindle finds a bearing on anti-frictional rollers caged in a particular and peculiar manner whereby opposed roller members are arranged in staggered relation to each other so that each series of rollers will have independent movement in relation to the other rollers, and the said rollers being of comparatively short lengths are thus rendered materially stronger than longer rollers, while they also produce a more flexible bearing than could be obtained by the employment of longer rollers.

A further object is the construction of a bearing box for railway trucks in which the axle spindle finds a bearing on comparatively short anti-frictional rollers arranged in opposed series which have a staggered relation to each other, and also wherein anti-frictional thrust rollers are employed for compensating for any longitudinal movement of the axle with respect to the bearing box, and also wherein means are employed for adjusting the thrust rollers with respect to the journal box and with respect to the axle spindle.

It is also my purpose to produce a journal box for railway trucks of a peculiar construction, wherein a body member is employed and which has removable cap plates at the ends thereof, the said body being supported on the truck in a manner to permit of a slight rocking in a lateral direction with respect to the truck, the said body having therein opposed series of staggered anti-frictional rollers which provide bearings for the axle spindle, and having caged rollers at the ends of the spindle for compensating for the outward movement or thrust of the spindle with respect to the box, means being provided for adjusting the thrust rollers with respect to the axle spindle, and means being also provided for taking up wear on any of the parts.

It is also a purpose of this invention to produce a journal box for railway trucks in which anti-frictional roller bearings and anti-frictional thrust bearings are provided for the axle spindle, in which means is employed for adjusting the thrust bearings with respect to the spindle in which means are employed for regulating the relative arrangement of the movable parts with respect to the stationary parts, and in which a lubricant may be readily inserted without removing any of the main parts of the device, and also in which the said lubricant is effectively retained in the box in sufficient quantity to lubricate the parts for a comparatively great length of time, so that frequent lubrication will thus not be necessary.

It is a still further object to produce a journal box for railway trucks, in which anti-frictional rollers provide bearings and thrust means for the axle spindle so that the employment of brasses, brass wedges, waste and dope will be entirely dispensed with, and also wherein the danger of hot boxes, cut journals, and disastrous wrecks which are frequently caused by heated journals will also be effectively overcome.

The foregoing objects, and others which will appear as the nature of the invention is better understood, may be accomplished by a construction, combination and operative arrangement of parts such as is disclosed by the drawings. The nature of the invention is such as to necessarily render the same susceptible to various modifications, so the showing of the drawings is to be considered merely illustrative, and I am entitled to make all such changes therefrom as fall within the scope of my claims.

In the drawings:—

Figure 1 is an approximately central vertical longitudinal sectional view through a journal box in accordance with this invention.

Fig. 2 is a side elevation thereof, parts in section.

Fig. 3 is a top plan thereof, parts broken away and in section.

Fig. 4 is a front elevation with parts broken away and in section.

Fig. 5 is a fragmentary sectional view through the cage for the roller bearings.

Fig. 6 is a similar sectional view through the cage for the thrust bearings.

Fig. 7 is a fragmentary perspective view of the cage for the thrust bearings.

The body 1 of my improved journal box is preferably of tubular formation and has its ends closed by an outer or cap plate 2 and an inner ring plate 3.

The body 1, at the top thereof is centrally formed with an upstanding transversely arranged enlargement 4 that has its ends rounded and upon the said enlargement rest the upper frame bars 5 of the truck (not shown). At the ends of the enlargement or boss 4, the body 1 is provided with outstanding ears 6. The under face of the body is also provided with outstanding ears 7 which are arranged directly opposite the ears 6, and the sides of the body, as well as the ears 6 and 7, are reinforced by ribs 8. By reference to Fig. 2 of the drawings it will be seen that the opposed ribs are inclined inwardly from their ends to the center thereof, and the said central portions, indicated for distinction by the numeral 9 thus provide contact or fulcrum elements for sleeves 10 that extend through elongated openings 11 in the respective ears 6—7. Through the sleeves 10 pass bolts 12 that also pass through the upper frame bars 5 and the lower frame bar 13. The outer or upper ends of the bolts are headed and the lower ends thereof are engaged by nuts 14 that contact with the under face of the lower truck frame bar 13. The under face of the bearing does not contact the frame bar 13, and the construction is such that the frame of the truck is permitted a limited lateral swinging motion on the journal box. This movement of the truck frame on the journal box is of vital importance, as the journal box and the bearings carried therein must at all times be retained in longitudinal alinement with the spindle of the axle, otherwise injury would be inflicted to the bearings and perhaps to the spindle. The wheels of the car must, of course, at all times rest on the rails of the track, and the rails on one side of the track may be arranged at a different elevation than the rails on the other side of the track. This is particularly true with respect to the switch rails of a siding, and hence the necessity of a yielding bearing between the truck frame and the journal box.

Both the cap plate 2 and the rear or ring plate 3 have their inner faces provided with peripheral enlargements or flanges 15 and 16 respectively, and on the inner edge of the flange 15 of the cap plate 2 there is an outstanding annular lip 17. The plates 2 and 3 have bolt openings therethrough, and the ends of the body 1 have threaded sockets which aline with the said openings and which receive therein the threaded ends of the retaining bolts 18—18 and 19—19 respectively.

By reference to Fig. 1 of the drawings it will be noted that the tubular body 1, at the end thereof on which the cap plate 2 is bolted has an inner thickened portion 20 that provides on its inner edge a shoulder 21. Before the rear plate 3 is bolted on the body 1, I swage therein a case hardened bushing 22 that has its inner end contacting with the shoulder 21 and its opposite end flush with the rear end of the body.

On the spindle of the journal 23 I swage a case hardened bushing 24. This bushing is flush with the end of the spindle or in a line with the end thereof on which the reduced centrally arranged threaded extension 25 is formed. The opposite end of the bushing 24 terminates a slight distance inward of the rounded or flared connection of the spindle with the axle proper, and bears against an oil retaining ring 26. The ring 26 is really in the nature of a disk, and has its outer face provided with continuous intersecting tongues and grooves. The ring plate 3 has its inner face also provided with intersecting tongues and grooves, and the tongues 27 of the said plate 3 are designed to be snugly received in the grooves 28 between the tongues of the oil retaining ring. By reference to Fig. 1 of the drawings it will be seen that the bore of the oil retaining ring 26 is flared to correspond with the flared shoulder between the spindle and axle of the journal. The ring 26 prevents a lubricant from seeping through the box between the journal and the rear or ring plate 3 of the box.

Between the bushings 22 and 24 I arrange the anti-friction roller bearings. In Fig. 5 of the drawings I have illustrated a detail of the cage construction for the said bearings. It will be seen that I employ four annular or ring members 29 respectively. The inner ring members are arranged in contacting engagement. At determined spaced intervals the outer and inner series of rings have registering openings through which are passed rods 30. Each of the rods 30 is of a length equaling the distance between the inner faces of the inner rings and the outer faces of the outer rings. The rods 30 have both of their ends flared to provide beveled heads 31 that are received in reamed portions of the rings that surround the openings through which the rods pass. The rods are arranged in staggered relation to each other, that is the series of rods between the inner and outer ring members of the cage are arranged approximately centrally with respect to each other. The ends of the rods 30 have their inner headed portions formed with substantially cone-shaped teats 32, and the outer rings have pockets for short rods 33 that have their projecting ends also formed with conical teats 34. It will be noted that the teats 32 and 34 of each of the cage sections are disposed in opposed alinement with each other, and these teats provide bearings for the anti-frictional rollers 35. The rollers 35 are case hardened and preferably have their edges rounded inwardly. The sockets in the ends of the said rollers loosely receive therein the bearings provided by the elements 32 and 34. It should here be stated that the rollers 35 are arranged on their bearings 32 in the inner ring members before the outer ring members receive the rods 30, and that the outer heads of the rods 30 are formed thereon after the rollers are received in both their inner and outer bearings 32 and 34. The particular and peculiar construction of the cage not only arranges the opposed series of rollers in staggered relation to each other, but permits of each roll having an independent action on the bushings 22 and 24, and in addition to this the bearing rollers, being of comparatively short lengths, can withstand greater strain than can the same of the length of the bushings, so that the life thereof is greatly prolonged.

On the outer end of the bushing 24 there is a series of spaced projecting pins 36. These pins are received in sockets in an inner bearing disk or plate 37. Disposed on the outer face of the inner bearing plate or disk 37 is the annular thrust roller bearing plate or cage 38. The cage 38 is provided with spaced peripheral pockets 39, the side walls of which being open to the sides of the plate, and the end walls of which are concaved. Disposed centrally in the concaved end walls 40 of the pockets 38 are bearing rods 41 which contact with the thrust rollers 42. By reference to Fig. 6 of the drawings it will be seen that the thrust rollers have their confronting or outer faces formed with rounded projections 43, which reduce the friction between the rollers as well as the friction between the inner rollers and the inner walls of the pockets 38. The pockets are closed by a ring member 44 that is arranged on the periphery of the thrust roller retaining disk or cage, and the said ring has its outer periphery disposed in a line with the outer periphery of the inner bearing plate or disk 37, while the inner periphery of the annular thrust roller is disposed a considerable distance inward of the inner periphery of the said plate 37.

On the outer face of the thrust roller cage is the outer bearing plate or disk 45. The disk 45 is of a slightly less cross sectional diameter than that of the thrust bearing roller cage and its peripheral ring 44, but the outer periphery of the said disk 45 is arranged flush with the outer surface of the ring 44.

Screwed on the threaded extension 25 of the bearing is a nut 46 which, of course, is arranged inward of the cap plate 2. The nut 46 has its body portion, at its outer end reduced as at 47 and its opposite end flanged or headed as at 48. The reduced end 47 of the nut is in contacting engagement with the inner bearing plate or disk 37, but the body of the nut does not contact with the inner periphery of the thrust roller cage of the inner periphery of the outer bearing disk 45, nor does the head of the nut contact with the outer face of the outer bearing disk.

The threaded extension 25 of the journal has a transverse notch on its outer face, and the head 48 of the nut 46 has alining notches. In the referred to notches there is received a lock bar 49 held therein by a bolt 50 that enters a threaded opening in the journal extension 25. The threads of the nut and the threads of the bolt are so pitched that when the nut is given a one-half turn or a full turn on the extension 25 the notches will be brought into registering alinement so that the locking bar may be properly received therein. It is, of course, obvious that the bolt 50 must be removed when the nut is adjusted on the journal, and the contacting engagement of the nut with the inner bearing plate or disk 37 retains the latter in proper engagement with the bushing 24 and also retains the cage bearing rollers in proper bearing position with respect to the bushings 22 and 24. By adjusting the bolts 18 of the cap plate 2, the lip 17 thereof is brought into proper contacting engagement with the outer bearing plate or disk 45, so that the thrust rollers 42 will properly contact with the plate or disk 37. It will be thus noted that adjusting means is provided for the thrust rollers as well as means for taking up wear on any of the parts of the device. The journal box, as stated, is susceptible to a slight but desirable tilting movement with respect to the truck, while any friction between the stationary and movable parts is entirely eliminated.

The cap plate 2 has a central threaded oil opening therein, that is normally closed by a threaded headed member 51. The lubricating oil is inserted in the box through this opening, and, of course, will not reach a level above the opening. Sufficient lubricant, however, is thus arranged in the box to lubricate the parts for an extensive period, say from three to six months and may be longer. The oil is effectively pocketed in the box, as the cap plate will prevent its passage through the front end of the box and the ring 26 will prevent its seeping through the inner end of the box.

It is believed that the foregoing description, when taken in connection with the drawings will fully set forth the construction and advantages of my improvement to those skilled in the art to which such inventions relate without further detailed description.

Having thus described the invention, what I claim, is:—

1. In a journal box for the projecting spindles of car wheel axles, and a mount for the box susceptible to a limited lateral movement on said box, of roller bearings between the spindle and box, a cage for the bearings comprising a pair of contacting inner ring members and outer ring members, staggered rods passing through the inner ring members connecting the outer ring members thereto, teats on the inner ends of the rods, inwardly projecting teats on the outer ring members disposed opposite the teats on the rods, and said rollers having their ends provided with sockets to freely receive therein the opposed pairs of teats.

2. A journal box for the projecting spindle of a car axle, and a mounting for the box susceptible to a limited lateral angular movement on the box, of anti-frictional rollers arranged in opposed series in the box, cages for the rollers, comprising a pair of inner contacting ring members and outer ring members, staggered rods passing through the inner ring members and connected to the outer ring members, teats on the inner ends of the rods, teats on the outer rings opposite the teats on the rods, said rollers having their ends freely journaled on the opposed pairs of teats, a case hardened bushing on the spindle engaged by the rollers, a flat ring surrounding the spindle contacting the inner face of the journal box and also in contacting engagament with the inner end of the bushing, annular interengaging means between said ring and said box, a flat bearing disk removably secured to the bushing, spaced from contact with the spindle and surrounding the roller cage, superimposed anti-frictional rollers contacting the outer face of said disk, and adjustable means on the end of said spindle retaining the rollers in such contacting engagement.

3. In a journal box for the spindle of a car wheel axle, means supporting the same, means for permitting a limited rocking movement of the support on the journal box, a car axle spindle received in the box, a case hardened bushing swaged in the box, a case hardened bushing swaged around the spindle, anti-frictional rollers between the bushings caged in opposed series that are arranged in staggered relation to each other, a flat ring in the box in contacting engagement with the shoulder between the spindle and axle and contacting with the inner face of the box, annular interengaging means between the ring and the said face of the box, an inner bearing disk removably secured to the bushing of the spindle over the roller cage and out of contact with the spindle, spaced superimposed anti-frictional rollers contacting the outer face of the said disk, an outer bearing disk for the rollers, and the rollers being held in loose engagement between the outer and inner bearing disks.

4. In a journal box for the spindles of car axles, means supporting the same, means for permitting a limited rocking movement of the support on the box, said box including a body having removable ends, an axle received in one end and having a spindle projecting in the box and the said spindle having a threaded extension at the end thereof, a flat ring surrounding the spindle in contacting engagement with the inner end of the box, means establishing a fluid tight joint between the ring and box, a bushing swaged on the spindle in contacting engagement with the ring, a bushing swaged in the box surrounding the first mentioned bushing, anti-frictional rollers disposed in opposed series arranged in staggered relation with each other between the bushings, a flat inner bearing disk removably associated with the bushing of the spindle spaced from said spindle and inclosing and covering the space between the bushings, an annular member comprising a cage arranged at the outer face of the inner bearing disk and having peripheral pockets, superimposed thrust rollers having rounded contact portions arranged in each of the pockets, anti-frictional means between the pockets and said rollers, means retaining the rollers in the pockets, an outer flat bearing disk arranged against the cage and rollers, the rollers being held in loose engagement between the outer and inner bearing disks, and means for adjustably locking the adjustable means on the threaded end of the spindle.

5. An anti-frictional bearing, comprising rollers arranged in opposed series that are in staggered relation with respect to each other, and a cage for the said rollers, said cage comprising a pair of inner contacting rings and outer rings, rods passing through the rings having their ends counter-sunk in the rings, teats on the inner ends of the rods, teats on the inner faces of the outer rings opposite the teats on the rods, and said rollers having their ends provided with sockets to freely receive therein the opposed pairs of teats of the cage.

6. A journal box for the spindles of car axles comprising a body, removable plates closing the ends thereof, means for adjusting the plates with respect to the body, a support for the body, means for permitting a limited tilting movement of the body on the support, a spindle entering the body through one of the plates, said last mentioned plate having its inner face grooved, an oil ring on the spindle having its outer face tongued to be received in the grooves, a bushing swaged on the spindle and contacting the oil ring, a bushing swaged in the box, anti-frictional rollers between the bushings, a bearing plate removably secured to the first mentioned bushing and disposed opposite the end of the spindle, thrust anti-frictional rollers contacting said plate, a cage therefor, a member surrounding the cage for retaining the rollers therein, an outer bearing plate contacting the cage, a nut screwed on the axle spindle and contacting the first mentioned bearing plate, the outer closure plate of the box having a lip contacting with the last mentioned bearing plate, a normally closed oil inlet in the said closure plate, and means between the nut and the axle spindle for locking the nut thereto at varying adjustments thereon.

In testimony whereof I affix my signature.

LEO K. STAFFORD.